US010161374B2

(12) United States Patent
Serkh et al.

(10) Patent No.: US 10,161,374 B2
(45) Date of Patent: Dec. 25, 2018

(54) ACCESSORY BELT DRIVE SYSTEM WITH MULTIPLE RATIOS AND TORQUE REVERSAL

(71) Applicant: Gates Corporation, Denver, CO (US)

(72) Inventors: Alexander Serkh, Troy, MI (US); Keming Liu, Sterling Heights, MI (US); Ilya Kleyman, Bloomfield Hills, MI (US)

(73) Assignee: Gates Corporation, Denver, CO (US)

( * ) Notice: Subject to any disclaimer, the term of this patent is extended or adjusted under 35 U.S.C. 154(b) by 179 days.

(21) Appl. No.: 15/403,660

(22) Filed: Jan. 11, 2017

(65) Prior Publication Data

US 2018/0195483 A1    Jul. 12, 2018

(51) Int. Cl.

| F02M 11/00 | (2006.01) |
|---|---|
| F16H 7/02 | (2006.01) |
| F02N 11/08 | (2006.01) |
| F16H 37/06 | (2006.01) |
| F16H 7/12 | (2006.01) |
| F02N 11/04 | (2006.01) |
| F02B 67/06 | (2006.01) |
| F16H 7/08 | (2006.01) |

(52) U.S. Cl.
CPC .......... *F02N 11/0851* (2013.01); *F02B 67/06* (2013.01); *F02N 11/04* (2013.01); *F16H 7/02* (2013.01); *F16H 7/1281* (2013.01); *F16H 37/065* (2013.01); *F16H 2007/0865* (2013.01); *F16H 2007/0874* (2013.01); *F16H 2007/0893* (2013.01)

(58) Field of Classification Search
CPC .... F02N 11/0851; F02N 11/04; F16H 37/065; F16H 7/02; F16H 7/1281; F02B 67/06
See application file for complete search history.

(56) References Cited

U.S. PATENT DOCUMENTS

| 4,969,857 A | 11/1990 | Kumm |
| 7,086,981 B2 | 8/2006 | Ali et al. |
| 7,316,628 B2 | 1/2008 | Serkh |
| 7,798,928 B2 | 9/2010 | Serkh |
| 2006/0154763 A1 | 7/2006 | Serkh |
| 2007/0232435 A1 | 10/2007 | Serkh |
| 2009/0013952 A1* | 1/2009 | Deniston ................ B60K 6/485 123/179.28 |

(Continued)

FOREIGN PATENT DOCUMENTS

| WO | 2012079795 A1 | 6/2012 |
| WO | 2012139224 A1 | 10/2012 |

OTHER PUBLICATIONS

European Patent Office, International Search Report and Written Opinion of the International Searching Authority, application No. PCT/US2018/013204, dated Apr. 4, 2018.

*Primary Examiner* — Jacob Amick
(74) *Attorney, Agent, or Firm* — Jeffrey A. Thurnau, Esq.; Paul N. Dunlap, Esq.

(57) ABSTRACT

A starter generator system comprising an engine driving a first belt and engaged with a second belt through a one-way clutch, a starter generator configured to be driven by the engine through the second belt or to drive the engine through the second belt according to an engine condition, and an accessory engaged with the second belt through an accessory clutch, the accessory drivable by the first belt or the second belt.

20 Claims, 17 Drawing Sheets

(56) References Cited

U.S. PATENT DOCUMENTS

| | | | |
|---|---|---|---|
| 2009/0255741 A1* | 10/2009 | Major | B60K 6/48 |
| | | | 180/65.22 |
| 2009/0266097 A1 | 10/2009 | Hamilton | |
| 2009/0298646 A1 | 12/2009 | Parsons | |
| 2016/0108806 A1 | 4/2016 | Serkh et al. | |

* cited by examiner

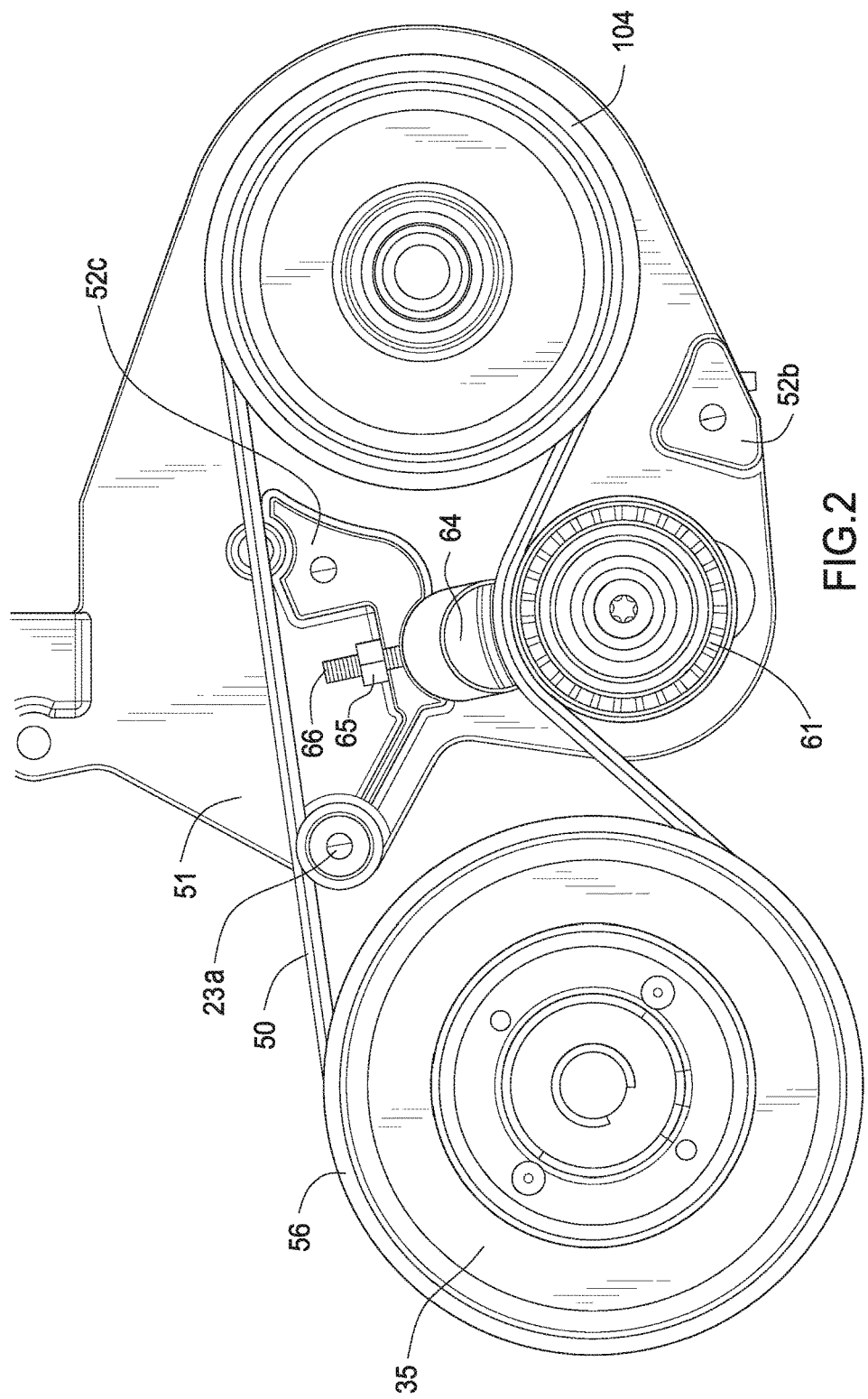

ACCESSORY BELT DRIVE SYSTEM WITH MULTIPLE RATIOS AND TORQUE REVERSAL

FIELD OF THE INVENTION

The invention relates to an accessory belt drive system with multiple ratios and torque reversal, and more particularly, to a starter generator system configured to be driven by the engine through a second belt or to drive the engine through a second belt according to an engine condition, and an accessory engaged with the second belt through an accessory clutch, the accessory drivable by a first belt or the second belt.

BACKGROUND OF THE INVENTION

Vehicle internal combustion engines (ICE) generally comprise accessories that are used in the operation of the engine and vehicle. Such accessories can include a power steering pump, an air conditioning compressor, an alternator, an oil pump, a fuel pump and so on. These accessories are generally driven by a serpentine belt. The serpentine belt engages a pulley on each accessory as well as on an engine crankshaft. The engine crankshaft provides the torque to drive the accessories.

As the belt is driven by the crankshaft it is necessarily subject to engine speed variations during acceleration and deceleration of the vehicle. In other words the operating speed of the accessories is directly proportional to the speed of the engine.

The variations in engine speed, particularly engine speeds greater than idle, result in inefficient operation of the accessories because each accessory must be designed to operate satisfactorily over the entire engine speed range. This necessarily means that the efficiency is less than optimum for most of the engine speed range. Further, at higher engine speeds greater power is required to drive the accessories, resulting in reduced fuel efficiency and reduced available torque. Therefore it is desirable to decouple some or all of the accessories from the engine crankshaft so they can be driven at a lower and narrower optimum speed range.

Additionally, the ICE will need to operate at all times to drive these accessories. Utilizing a belt starter generator (BSG) in conjunction with a two speed belt drive system allows for the ICE to be turned off during events when only accessories need to be driven providing significant fuel economy savings.

Representative of the art is U.S. Pat. No. 7,798,928 which discloses a dual ratio belt drive system comprising a clutch unit mounted directly to a driver rotating shaft, a one-way clutch mounted directly to the driver rotating shaft, a plurality of rotating accessories rotatably connected to the clutch unit and rotatably connected to the driver rotating shaft through the one-way clutch such that the accessories are driven by the clutch unit at a first speed ratio and driven directly by the driver rotating shaft through said one-way clutch at a second speed ratio, with the clutch unit operating at a predetermined value of an engine operating condition thereby defining the transition between the first and second speed ratios, and the clutch unit being engaged at engine start.

What is needed is a starter generator system configured to be driven by the engine through a second belt or to drive the engine through a second belt according to an engine condition, and an accessory engaged with the second belt through an accessory clutch, the accessory drivable by a first belt or the second belt. The present invention meets this need.

SUMMARY OF THE INVENTION

The primary aspect of the invention is to provide a starter generator system configured to be driven by the engine through a second belt or to drive the engine through a second belt according to an engine condition, and an accessory engaged with the second belt through an accessory clutch, the accessory drivable by a first belt or the second belt.

Other aspects of the invention will be pointed out or made obvious by the following description of the invention and the accompanying drawings.

The invention comprises a starter generator system comprising an engine driving a first belt and engaged with a second belt through a one-way clutch, a starter generator configured to be driven by the engine through the second belt or to drive the engine through the second belt according to an engine condition, and an accessory engaged with the second belt through an accessory clutch, the accessory drivable by the first belt or the second belt.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 2 is a detail of the bracket.

DETAILED DESCRIPTION OF THE PREFERRED EMBODIMENT

Figure 1A:
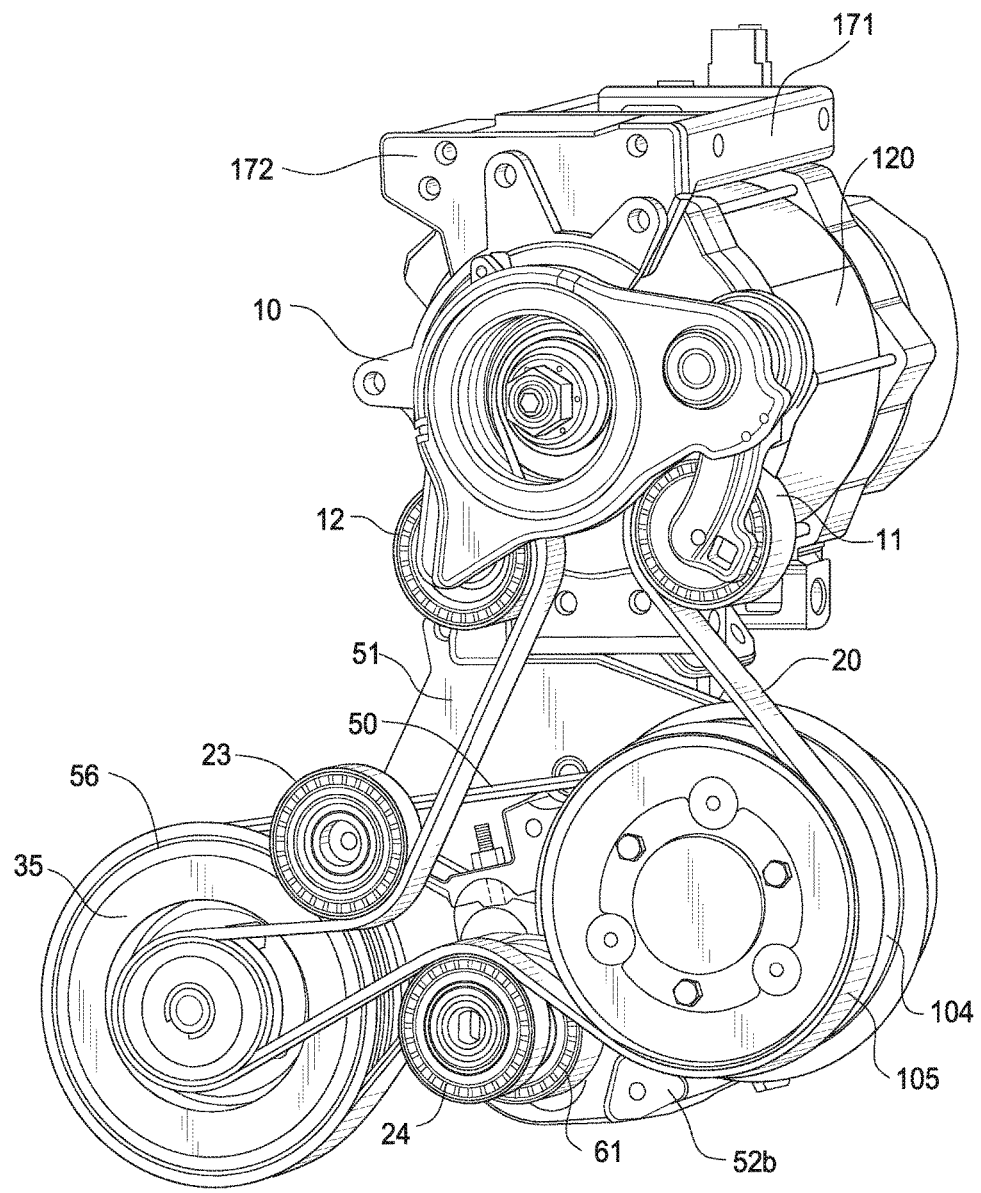
FIG. 1a is a perspective view of the system.

FIG. 1a is a perspective view of the system. The system comprises starter-generator 120 and air conditioner compressor (not shown) with adaptor 101. Tensioner 10 is mounted to the starter-generator through brackets 171 and 172.

Crankshaft pulley 31 is mounted to an engine crankshaft (not shown). Bracket 51 is also mounted to an engine.

Belt 20 is routed between crankshaft pulley 31, first clutch pulley 104, idler 11 and idler 12 of tensioner 10, starter generator pulley 13, and idler 23 and idler 24. Idler 23 is mounted on bracket 51 and idler 24 is statically mounted on bracket 75.

Belt 50 is installed between crankshaft pulley 56, and second clutch pulley 105 and idler 61.

Belt 20 and belt 50 are each a multi-ribbed belt.

Figure 1B:
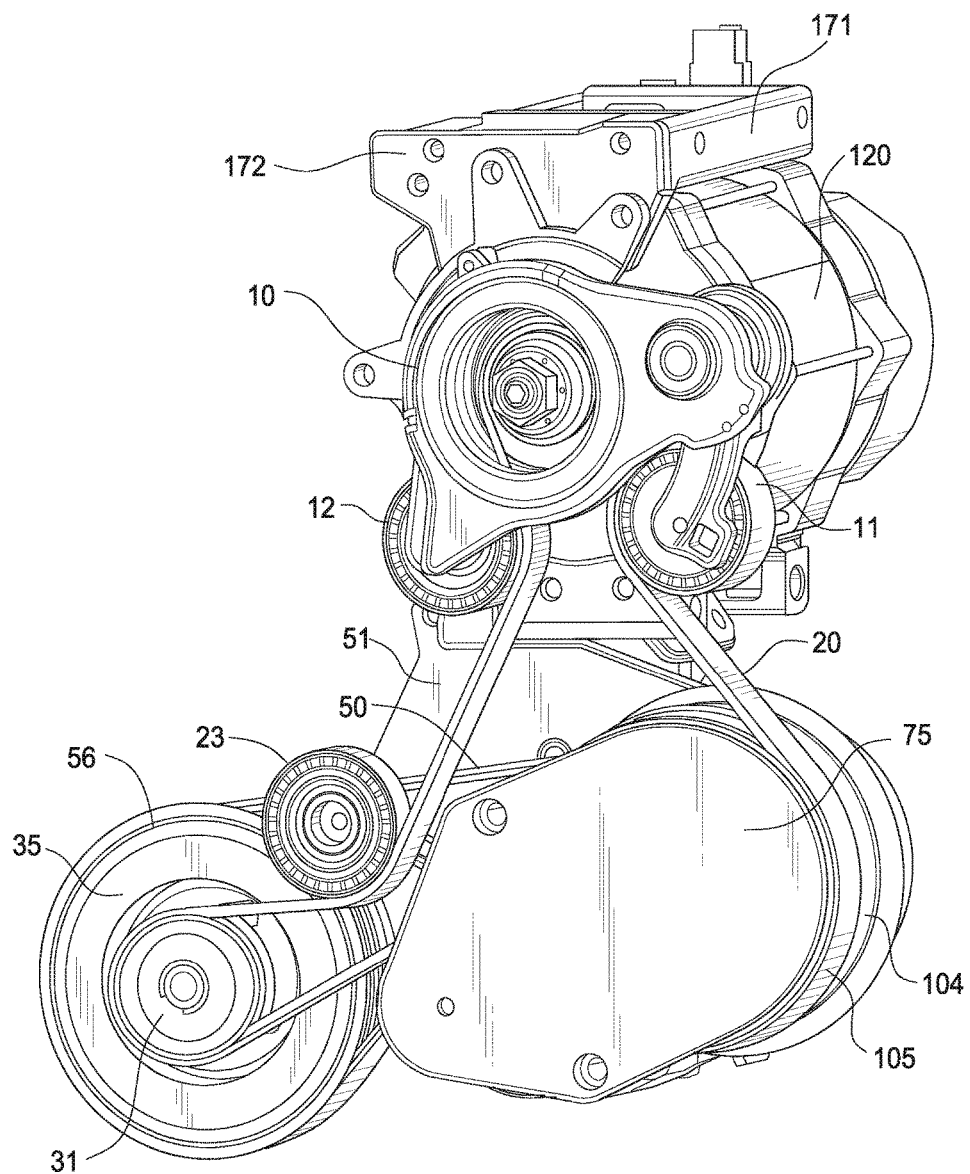
FIG. 1b is a perspective view of the system.

FIG. 1b is a perspective view of the system. Bracket 75 protects the air conditioner compressor pulley assembly. Bracket serves as a mounting surface for idler 24.

Figure 1C:
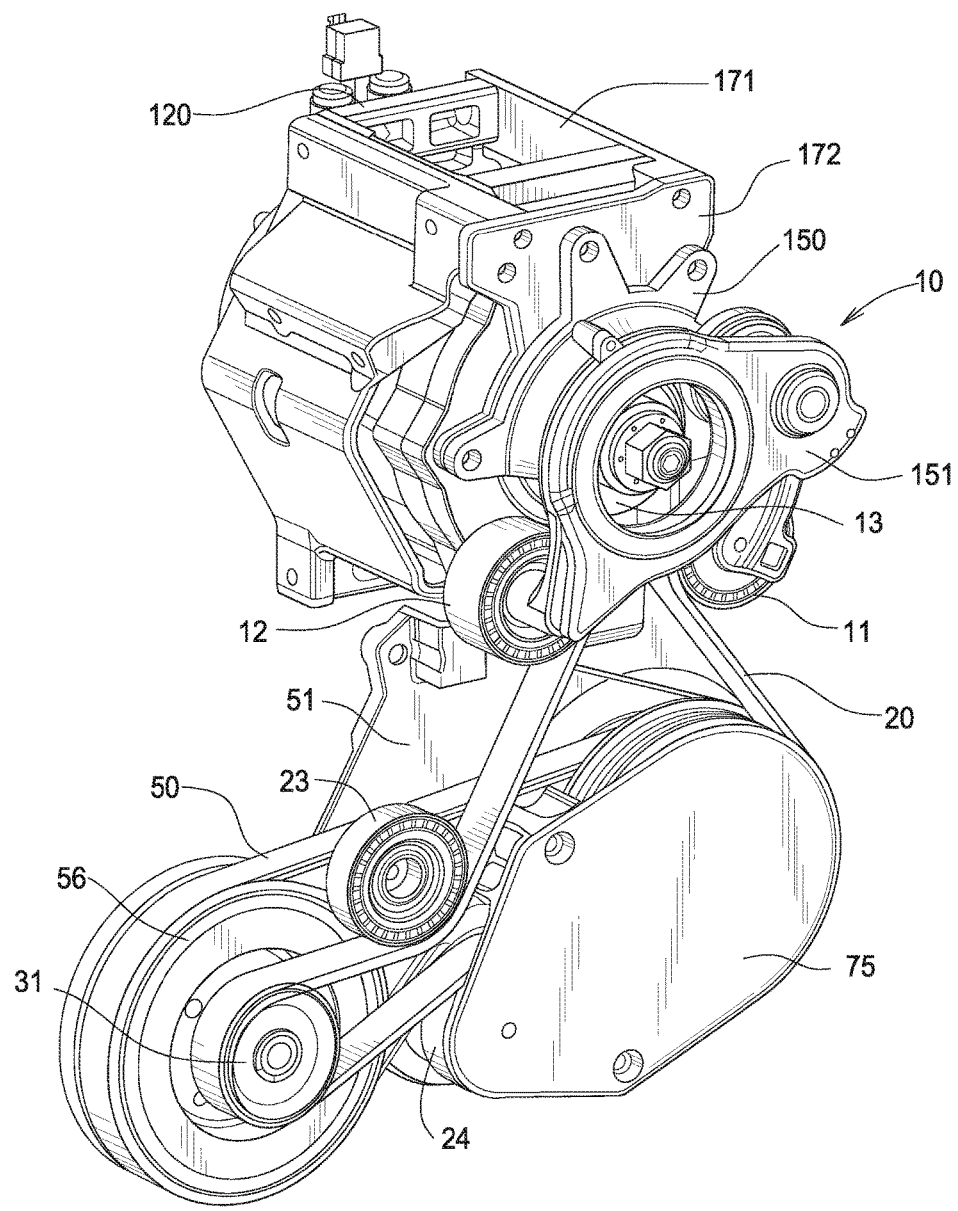
FIG. 1c is a perspective view of the system.

FIG. 1c is a perspective view of the system.

FIG. 2 is a detail of the bracket. Bracket 51 is mounted to an engine (not shown). The jackscrew assembly comprises idler 61 installed on bearing 69 with the fasteners 63 and 67. Dust shield 62 protects bearing 69. These components are installed on spacer 68 and jackscrew base 64. Fasteners 63 and 67 allow sliding motion of base 64 on bracket 51 in slot 51a. Nut 65 and screw 66 are installed between base 64 and bracket 51. As nut 65 is tightened about screw 66 it bears upon mounting portion 52c thereby retracting base 64, thereby retreating pulley 61. Belt 50 is tensioned as nut 65 is tightened and base 64 is retracted. The tension of belt 50 is adjusted during installation of the system.

Bracket 75 is mounted to mounting portion 52b and mounting portion 52c which protrude from bracket 51.

Figure 3:
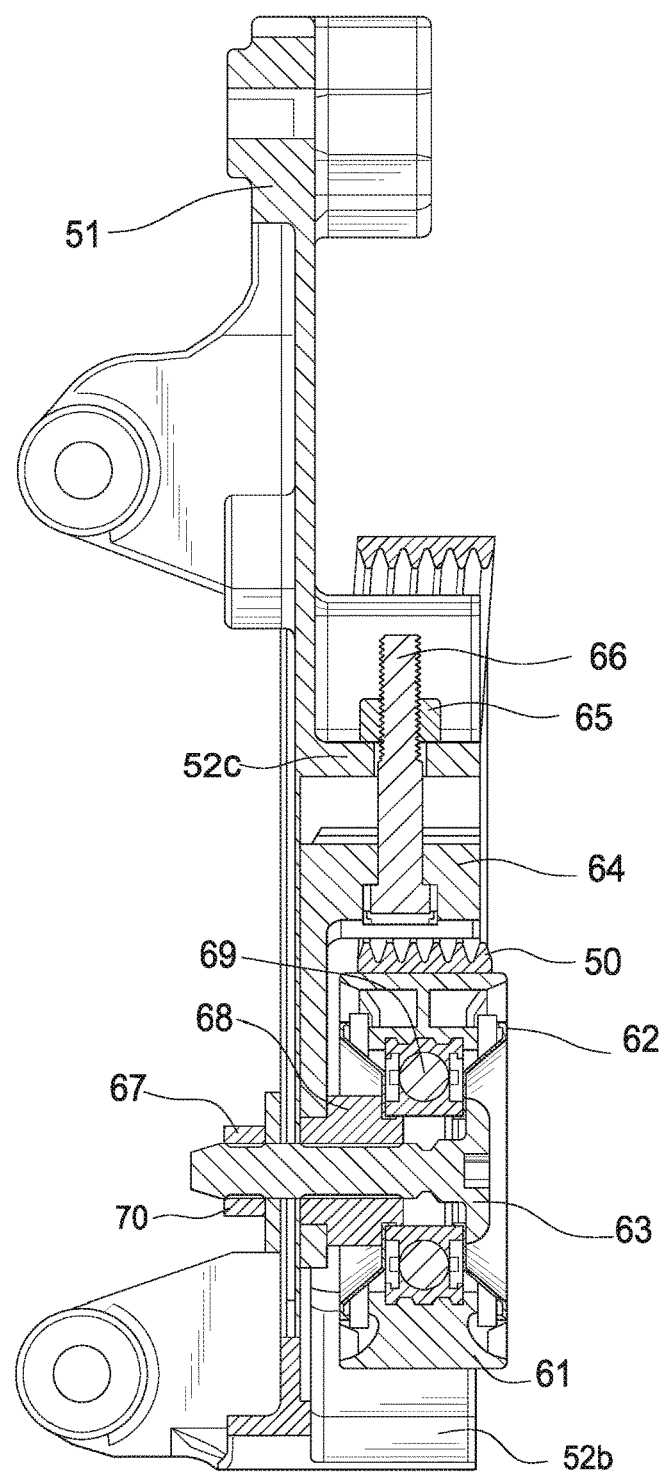
FIG. 3 is a cross section view of the bracket.

FIG. 3 is a cross section view of the bracket.

Figure 4A:
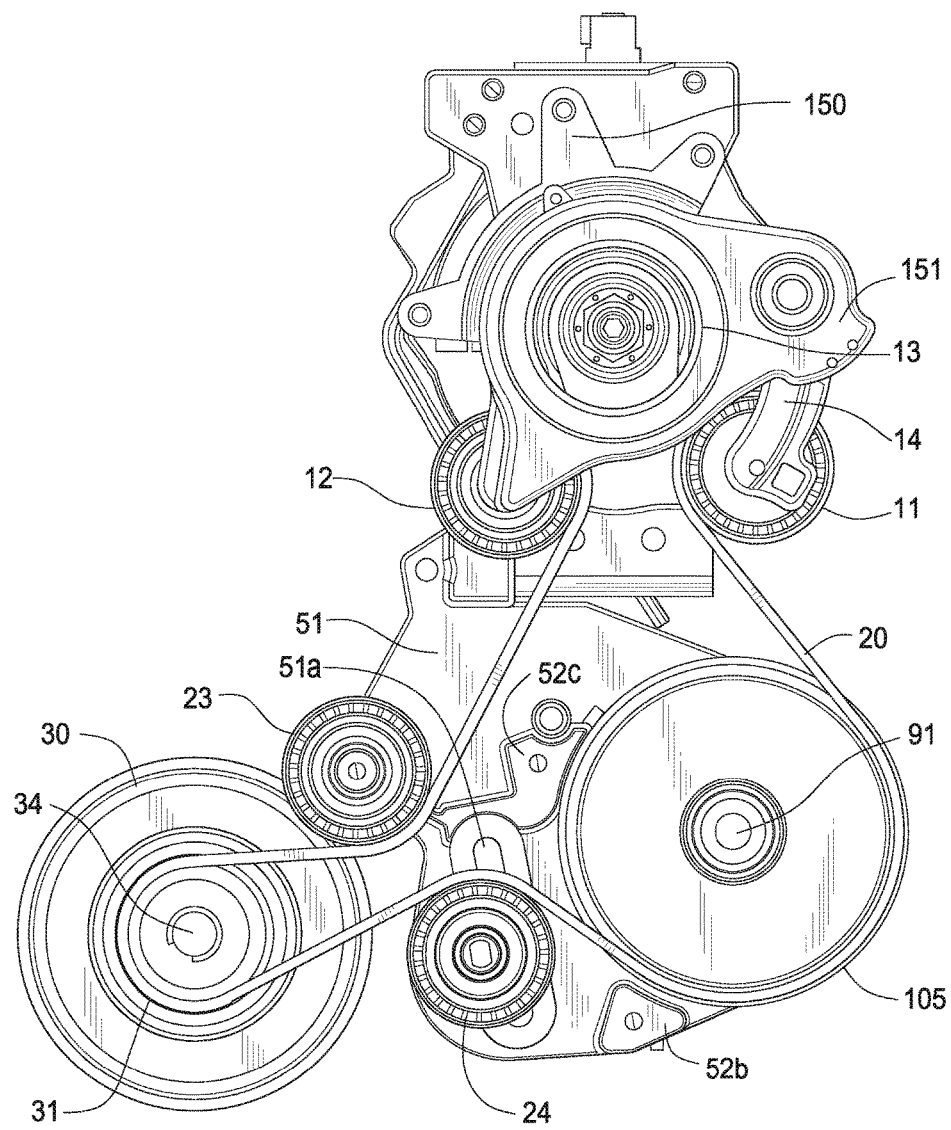
FIG. 4a is a front view of the system.

FIG. 4a is a front view of the system. Fastener 63 moves in slot 51a. Idler 24 is mounted to bracket 75. Belt 50 is not shown.

Figure 4B:
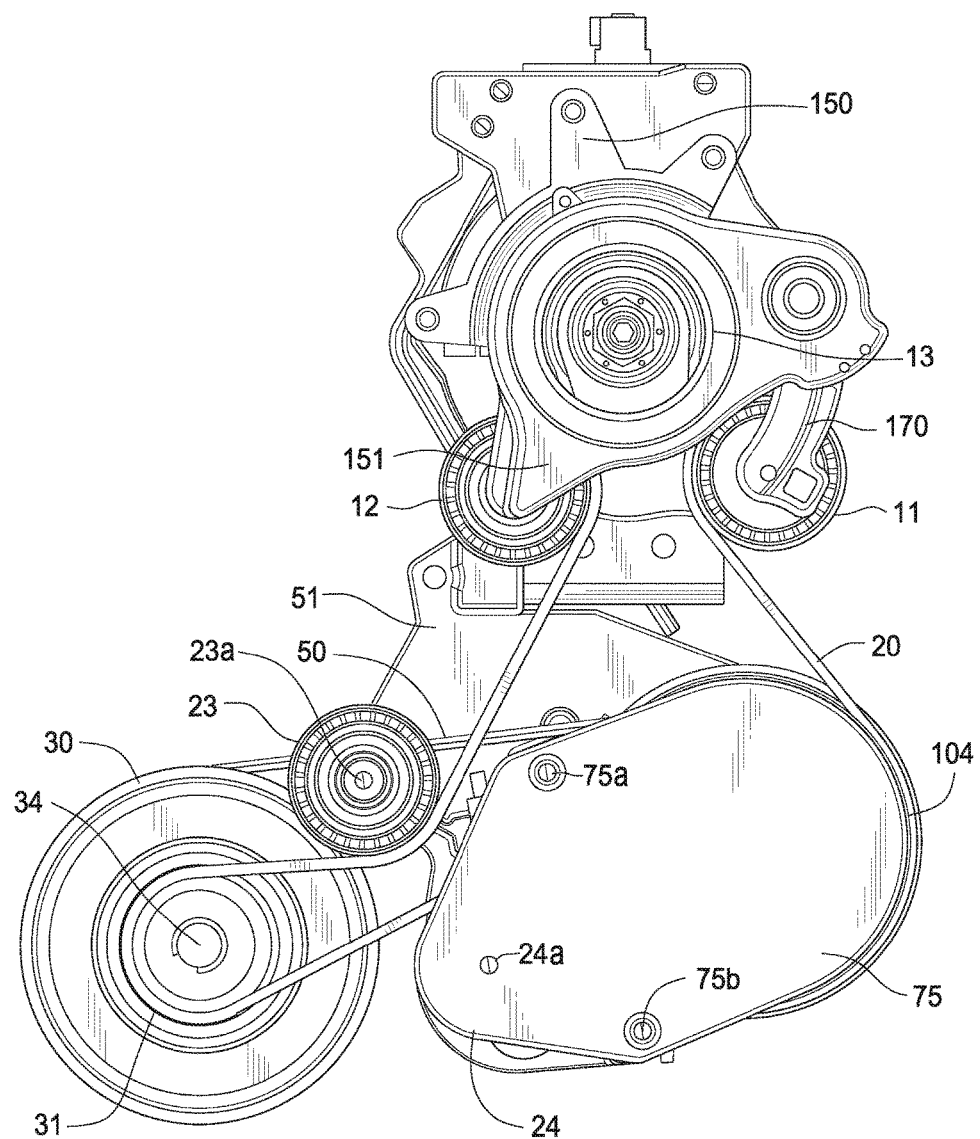
FIG. 4b is a front view of the system.

FIG. 4b is a front view of the system. Bracket 75 is shown mounted to bracket 51 using fasteners 75a and 75b. Idler 24 is mounted to bracket 75 by fastener 24a.

Figure 5:
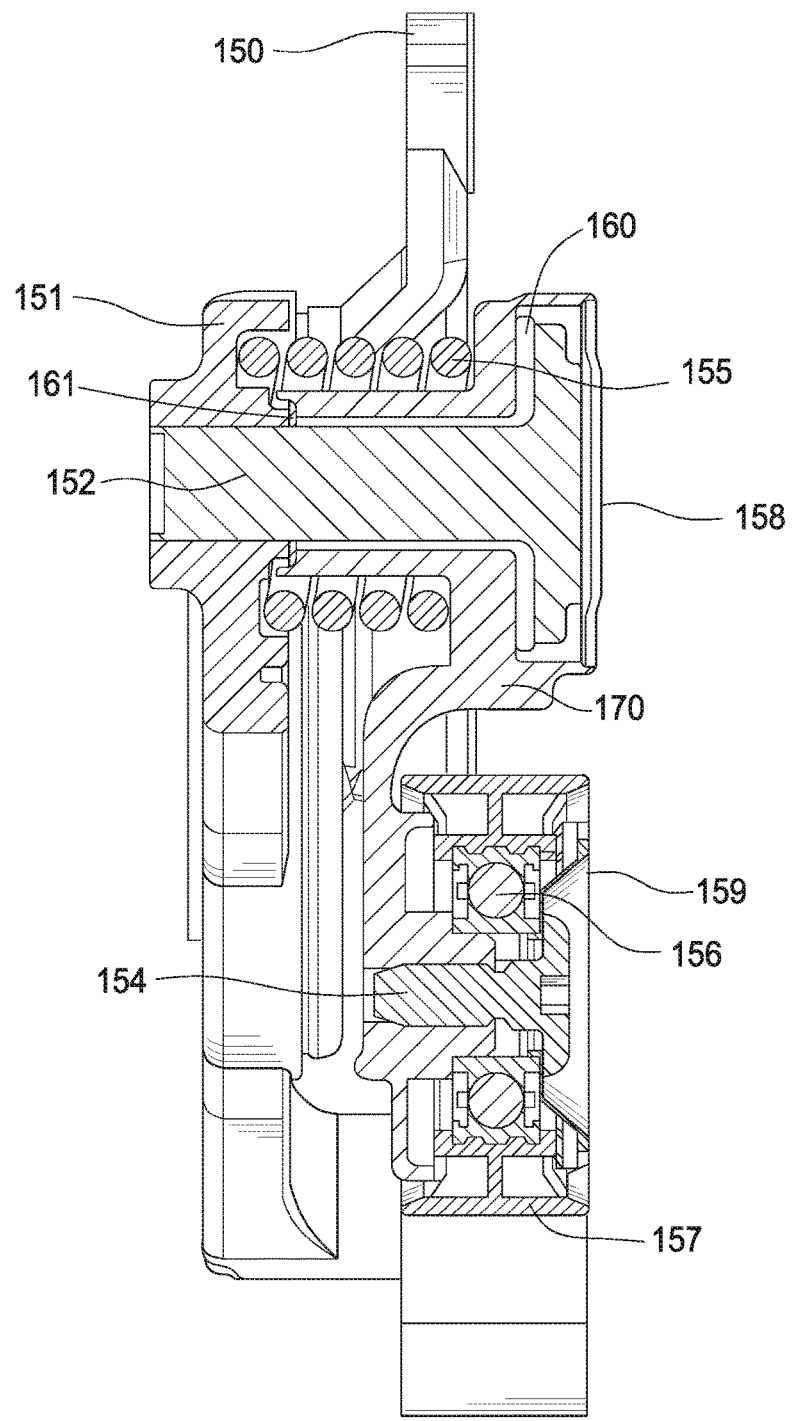
FIG. 5 is a cross section view of the tensioner.

FIG. 5 is a cross section view of the tensioner. Tensioner 10 reacts to changes in belt tension during different modes and speeds of the starter generator and engine. Tensioner 10 comprises base 150 mounted to the starter generator through brackets 171 and 172. Base 150 is connected to carrier 151 through bushing 168 and top plate 169 which may be stacked to carrier 151. Shaft 152 is press fit into carrier 151. Torsion spring 155 is engaged between shaft 152 and sidearm 170. Bushings 160 and 161 support the rotation of shaft 152 and sidearm 170. Pulley 157 is connected to sidearm 170 through fastener 154 and bearing 156. Dust cover 158 protects bushing 160 and 161 from external contamination.

Figure 6:
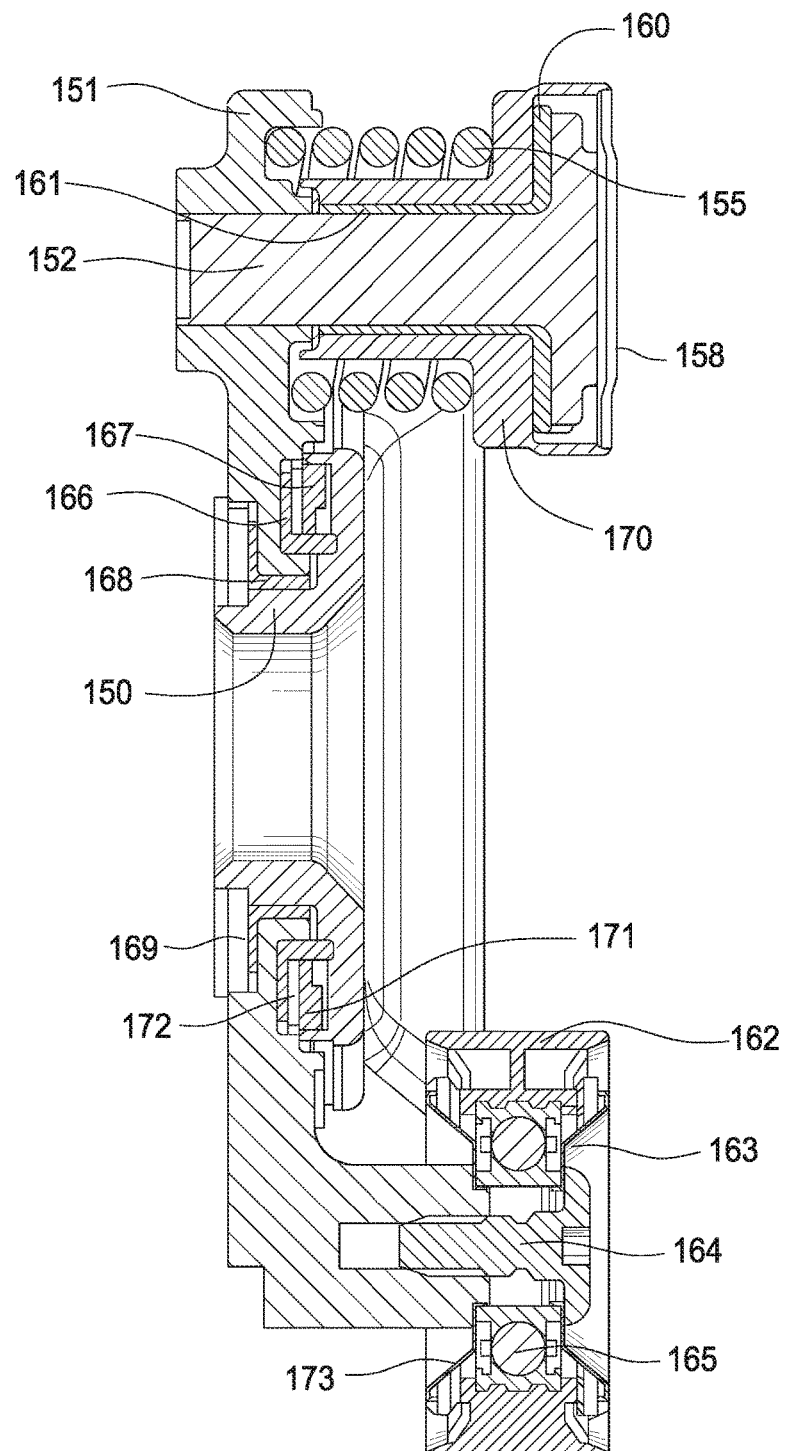
FIG. 6 is a cross section view of the tensioner.

FIG. 6 is a cross section view of the tensioner. Carrier 151 rotates within base 150. Pulley 162 is installed on carrier 151 through bearing 165. Bearing 165 is retained by fastener 164. Dust cover 163 protects bearing 165. As the tension of belt 20 changes during different modes of operation, carrier 151 may rotate about bushing 168. Torsion spring 155 applies torque to belt 20 thereby keeping proper tension on belt 20. Wave spring 171 bears upon plate 172. Plate 172 frictionally engages busing 166. The frictional engagement damps rotary oscillations of carrier 151. Ring 169 retains carrier 151 within base 150.

Figure 7:
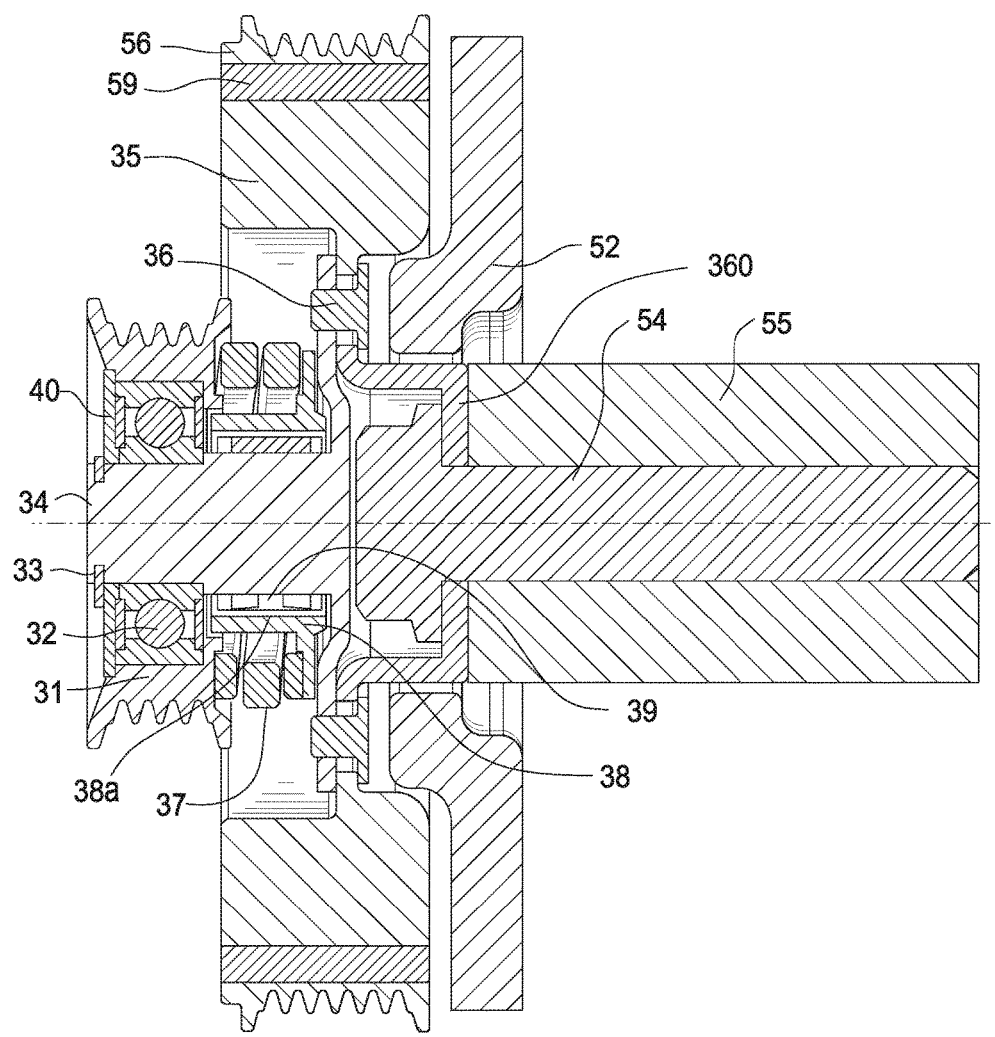
FIG. 7 is a cross section view of the crankshaft clutch.

FIG. 7 is a cross section view of the crankshaft clutch. The crank assembly comprises crankshaft pulley 31 that is installed on shaft 34 through bearing 32. Dust shield 40 protects bearing 32 and is retained by a retaining ring 33. Shaft 34 is clamped to hub 360 through the use of pins and fasteners 36. Shaft 34 is also clamped to harmonic damper 35 which includes crankshaft pulley 56. Harmonic damper 35 comprises elastomeric member 59. Torsion spring 37 is connected between clutch carrier 38 and crankshaft pulley 31 in various ways, including gluing and laser welding. One-way roller clutch 39 is installed on shaft 34 and engages clutch carrier 38. These components are installed on the engine crankshaft 55 using fastener 54 through a splined connection (not shown) with clearance to the engine front cover 52.

When the engine is driving in the first ratio, load is transferred to the harmonic damper 35 and through pulley 56 to belt 50. One-way clutch 39 is not engaged and overrunning. Load is transferred from crankshaft 55 to pulley 56 to belt 50 to first clutch pulley 104 that is connected to second clutch pulley 105 to belt 20 and to starter-generator pulley 13. When starter-generator 120 is driving load is transferred from pulley 13 to belt 20 to second clutch pulley 105 to first clutch pulley 104 to belt 50 to pulley 56 and to crankshaft 55. If the air conditioning compressor is required to be powered for cooling purposes regardless the power flow (from ICE to starter-generator or from starter-generator to ICE) the air conditioning clutch pulley 102 is engaged to clutch plate 103 which in turn is connected to the air conditioning shaft. Air conditioning pulley 102 is connected to second clutch pulley 105 via adapter 101.

When the engine is driving in the second ratio, load is transferred to the harmonic damper 35 and through pulley 56 to belt 50. One-way clutch 39 is not engaged and overrunning. Load is transferred from crankshaft 55 to pulley 56 to belt 50 to first clutch pulley 104 where load transfer is terminated. Engine in this ratio is not driving any accessories. First clutch pulley 104 is disconnected from second clutch pulley 105. If the air conditioning compressor required to be powered for cooling purposes starter-generator pulley 13 drives belt 20 which drives second clutch pulley 105. Air conditioning clutch pulley 102 is engaged to clutch plate 103 which in turn is connected to the air conditioning shaft. Air conditioning pulley 102 is connected to second clutch pulley 105 via adapter 101.

When the engine is driving in the third ratio, load is transferred from shaft 55 to hub 360 and to shaft 34. One-way clutch 39 will engage shaft 34 thereby loading torsion spring 37 in the winding direction by its end attached to clutch carrier 38. The other end of torsion spring 37 which is attached to crank pulley 31 resists the loading and the torsion spring 37 acts as an isolator. This will in turn cause torsion spring 37 to drive pulley 31 and belt 20. The torque magnitude will depend on the application, but is generally 45-60 Nm. Torque transfer will go from shaft 55 to hub 360 to shaft 34 through one-way clutch 39, clutch carrier 38, torsion spring 37, pulley 31, belt 20, second clutch pulley 105 to starter-generator pulley 13 and, to air conditioning pulley 102 via adapter 101. If air conditioning is required, the air conditioning clutch is engaged and pulley 102 is connected to clutch plate 103 driving the air conditioning compressor shaft (not shown). When the starter generator is driving belt 20 and pulley 31, one-way clutch 38 decouples from shaft 34 so no load is transferred to the engine through hub 360.

Figure 8:
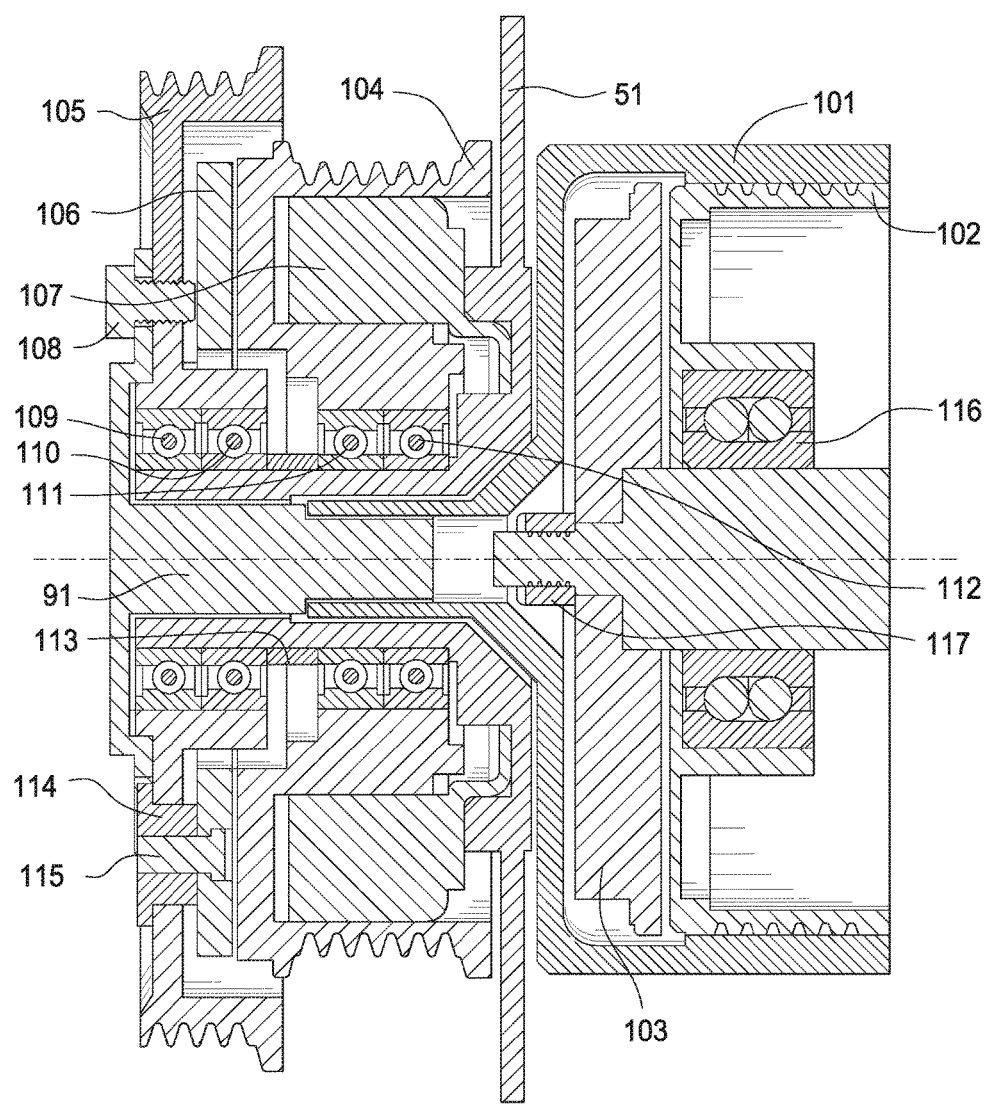
FIG. 8 is a cross section view of the AC clutch.

FIG. 8 is a cross section view of the AC clutch. The air conditioner compressor assembly comprises of clutch plate 103, pulley 102, shaft 108, fastener 117. Electromagnetic coil (not shown) connected to air conditioner housing (not shown). Adapter 101 which is press fit to pulley 102 and shaft 91. Shaft 91 is connected through fasteners 108 to pulley 105. Pulley 105 is mounted through bearings 109 and 110 to bracket 51. Spacer 113 keeps proper distance between bearing 110 and bearing 111. Bearing 111 and bearing 112 mount pulley 104 to bracket 51. Electromagnetic clutch coil 107 is mounted to bracket 51. Clutch plate 106 is fastened to pulley 105 through fasteners 115 and 114. When the electromagnetic coil 107 is engaged, clutch plate 106 creates a frictional connection to pulley 104 causing pulley 104 and pulley 105 to rotate together. This connection allows the starter generator to start the internal combustion engine. Clutch 106 is also engaged when the engine drives the ACC.

Figure 9:
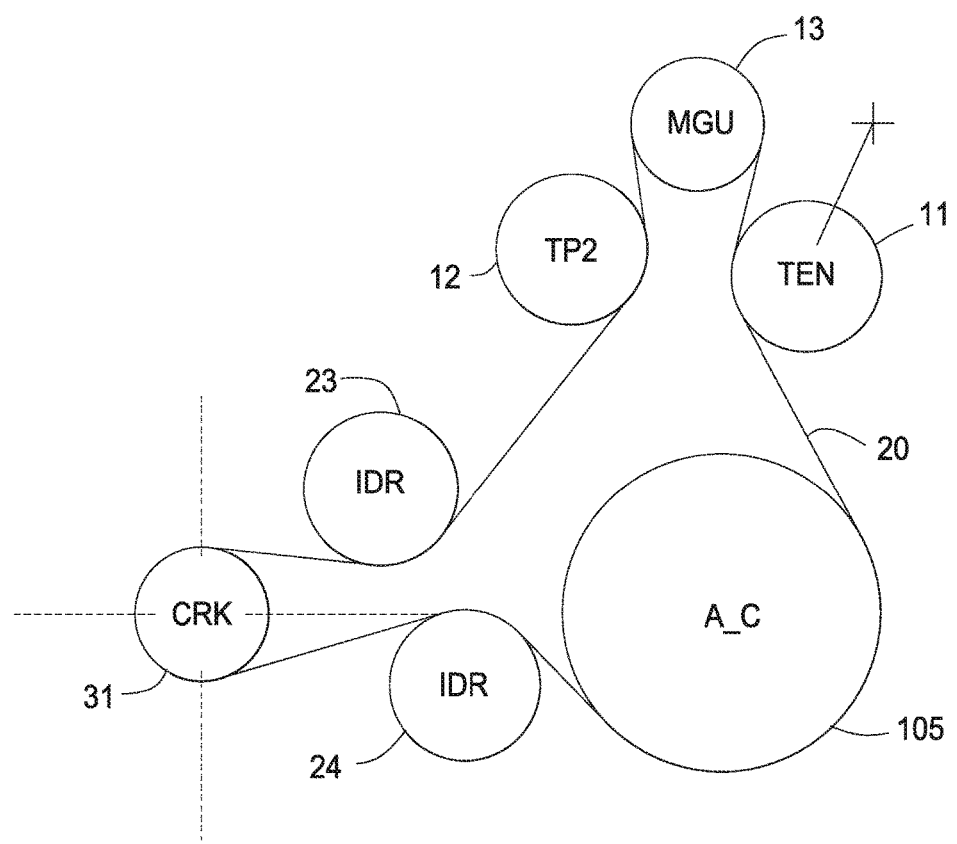
FIG. 9 is a schematic of the system on an internal combustion engine.

FIG. 9 is a schematic of the system on an internal combustion engine. FIG. 9 shows the routing of belt 20 among the system components.

Figure 10:
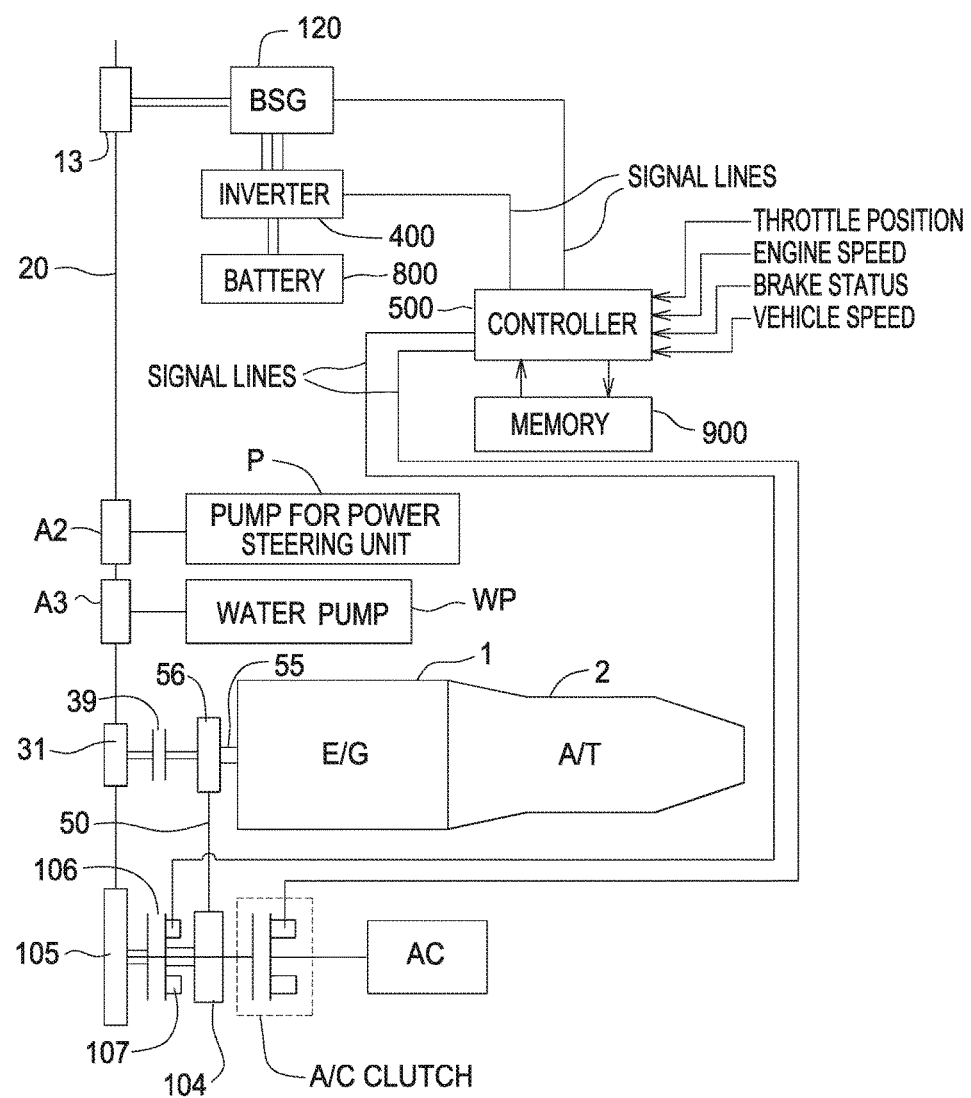
FIG. 10 is a schematic of the engine system.

FIG. 10 is a schematic of the engine system. The starter generator controller 500 is connected to input from the ECM (engine control module). Controller 500 obtains information on engine speed, throttle position, brake status, and vehicle speed. Controller 500 is also connected to the starter generator 120 and one-way clutch 39.

Pump P for a power steering unit and a water pump WP are each an accessory included in the engine belt drive system. Pulleys A2 and A3 are secured to the respective ends of the rotational shafts of the pump P and the water pump WP. Belt 20 is engaged among the pulleys A2, A3, 13, 31 and 105 for transmitting rotation of starter generator (BSG) 120 to the respective accessories.

An inverter 400 is electrically connected to BSG 120 and arranged to vary the amount of electric energy to be supplied from a battery 800 to the BSG 120 to control the speed of BSG 120 when BSG 120 is used in a motor mode. Inverter 400 also performs control to store electric energy generated by BSG 120 to battery 800.

Controller 500 transmits to inverter 400 a signal for controlling the engine running mode switching operation, ON-OFF control signals to the electromagnetic clutch 106 and ON-OFF control signals to the electromagnetic coil 41 of the transmission. Controller 500 also receives signals from various sensors disposed on the vehicle and on the engine that are indicative of a vehicle operating condition and/or of an engine operating condition. These include a signal indicating the speed of BSG 120, a signal for switching the engine running mode, a signal for switching the operation of the air conditioner, an engine status signal indicating, for example, the speed of the engine, a vehicle status signal (not shown) indicating the vehicle speed and the like, a wheel brake status signal, an engine throttle position signal, and a status signal of the A/T indicating the range selected by the shift lever. The brake status signal indicates the state of engagement of each wheel brake or all wheel brakes on the vehicle. The throttle position signal relates to the position of the throttle, which is indicative of the driver demand to the engine such as acceleration, deceleration, non-accelerating cruise or idle. Each signal may be either analogue or digital.

In accordance with information indicated by the above-mentioned signals controller 500 performs an operation for reading data from a memory 900 and a calculating operation to determine the state of the clutch 106, BSG 120 and E/G to achieve ratio of one, two, or three. Controller 500 then transmits control signals to the transmission electromagnetic coil 107 (electromagnetic clutch 106) and to inverter 400. Controller 500 may comprise a computer system provided with known components including a CPU, a RAM, a ROM, a bi-directional communication bus, interface circuits (a signal conversion circuit and the like), and a memory 900.

In operation, initially BSG 120 is operated to start the engine 1. After starting engine 1, BSG 120 acts as a power generator for recharging battery 800. When the engine is started, controller 500 detects the speed of BSG 120. Controller 500 also causes inverter 400 to perform a switching operation such that a torque and speed required to start the engine 1 are realized. For example, if a signal for switching the air conditioner A/C has been turned ON at engine start, a higher torque is required compared with the OFF state of the A/C. Therefore, controller 500 applies to inverter 400 a switching control signal to allow BSG 120 to rotate at a higher torque with a greater speed.

The switching control signal may be determined such that a variety of status signals of the engine 1, the A/T 2 and the vehicle are provided to the controller 500 and thereby collated with a map stored in the memory. Alternatively, the switching control signal may be determined by calculations performed by the processor unit (CPU) disposed in controller 500.

When an engine stop signal is turned ON controller 500 stops engine 1 by transmitting a signal for interrupting fuel supply to the engine 1 for example to an electric fuel pump (not shown). The engine stop operation can be performed under a condition where, for example, the vehicle speed is zero, the brakes are partially or fully applied, and the shift lever is in the D or N setting. Thus, no power is transmitted between the pulley 104 and the pulley 56 of engine 1. This is because the starting clutch (not shown) disposed in the A/T 2 is arranged to be immediately engaged for driving the vehicle smoothly upon re-starting of the engine.

In the case where the air conditioner and the power steering are required to be operated even if engine 1 is stopped, controller 500 applies to inverter 400 a switching control signal to rotate the BSG 120 at the speed and torque corresponding to the loads of the pump P for a power steering unit.

When the engine 1 is re-started from a state where the vehicle is stopped, BSG 120 in motor mode cranks engine 1 when electromagnetic coil 107 is turned ON thereby engaging clutch 106. Electromagnetic coil 107 is energized causing pulley 105 to rotate at a predetermined speed and torque.

When the BSG 120 is used as an electric generator, and/or the accessories are operated while engine 1 is operating in a first and second ratio, electromagnetic coil 107 is turned OFF and one-way clutch 39 is in an engaged state.

When the pump P and the compressor A/C are operated by BSG 120 in a second or third ratio while engine 1 is stopped, electromagnetic coil 107 is turned OFF. In this mode engine 1 is stopped and accessories including the air conditioning compressor, water pump and power steering pump are driven by BSG via belt 20. One-way clutch 39 is locked.

In operation the belt drive system has at least three ratios:

First ratio is for engine speeds close to idle and usually in the range of 650-1120 PRM. The ratio between the engine and the starter generator is approximately 3:1. This ratio is achieved with the clutch 107 ON and with one-way clutch 39 overrunning. Belt 50 transmits torque to pulley 104, pulley 105 and belt 20 transmits torque to the starter generator. Operation in this state allows the engine to drive the accessories. The engine is started and driven by the starter generator.

Second ratio is for engine speeds between 650 RPM to 2000 RPM. The ratio between the engine and the starter generator is approximately 1:1. This ratio is achieved with clutch 106 OFF and one-way clutch 39 is overrunning. The accessories are driven by the starter generator at speeds that make one-way clutch 39 overrun. Only belt 20 transmits load and is driven by the starter generator. Belt 50 is at no load. The engine is on and the vehicle is in motion. This ratio allows accessories to be driven by the starter generator at speeds that make the one-way clutch 39 overrun.

Third ratio is for engine speeds between 2000 RPM to 6500 RPM. The ratio between the engine and the starter generator is approximately 1:1. This ratio is achieved by the clutch 106 OFF, the accessories are driven by the engine, one-way clutch 39 is locked. Only belt 20 transmits the load and is driven by the engine. The engine is on and vehicle is in motion. This ratio allows the accessories to be driven by engine.

When the system switches between being driven by the engine and the starter generator, the slack and tight side of the belt switch and idler 23 and idler 24 keep proper belt tension for belt 20 in both modes of operation. The system operating logic is as follows. Each vertical column describes a different operating state for a given ratio.

|  | Ratio 1 | | | Ratio 2 | | | Ratio 3 | |
|---|---|---|---|---|---|---|---|---|
| Engine speed, rpm | | | | | | | | |
| 0 | X | X | | | | | | |
| 650 | | | X | | | | | |
| 650-2500 | | | | X | X | X | X | |
| 2500-6500 | | | | | | | X | X |
| Vehicle speed | | | | | | | | |
| zero | X | X | X | | | | | |
| Not zero | | | | X | X | X | X | X | X |
| Clutch 120 | | | | | | | | |
| on | | | X | X | X | | | |
| off | X | X | | | | X | X | X | X |
| One-way clutch 39 | | | | | | | | |
| on | | | | | | | X | X |
| off | X | X | X | X | X | X | X | |
| Brake position | | | | | | | | |
| Depressed | X | X | X | | X | | | — | — |
| Free | | | | X | | X | X | — | — |
| Throttle position | | | | | | | | |
| Zero | X | X | X | | X | | — | — | — | — |
| Min | | | | | | | — | — | — | — |
| Max | | | | X | | | — | — | — | — |
| Starter generator | | | | | | | | |
| Off | X | | | | | X | X | |
| Battery charging/driven | | | X | | X | | | X |
| Engine start, boost/driver | | X | | X | | X | | |
| Accessories state | | | | | | | | |
| required | | X | X | X | X | X | | X |
| not required | X | | | | | | X | X |

Figure 11:
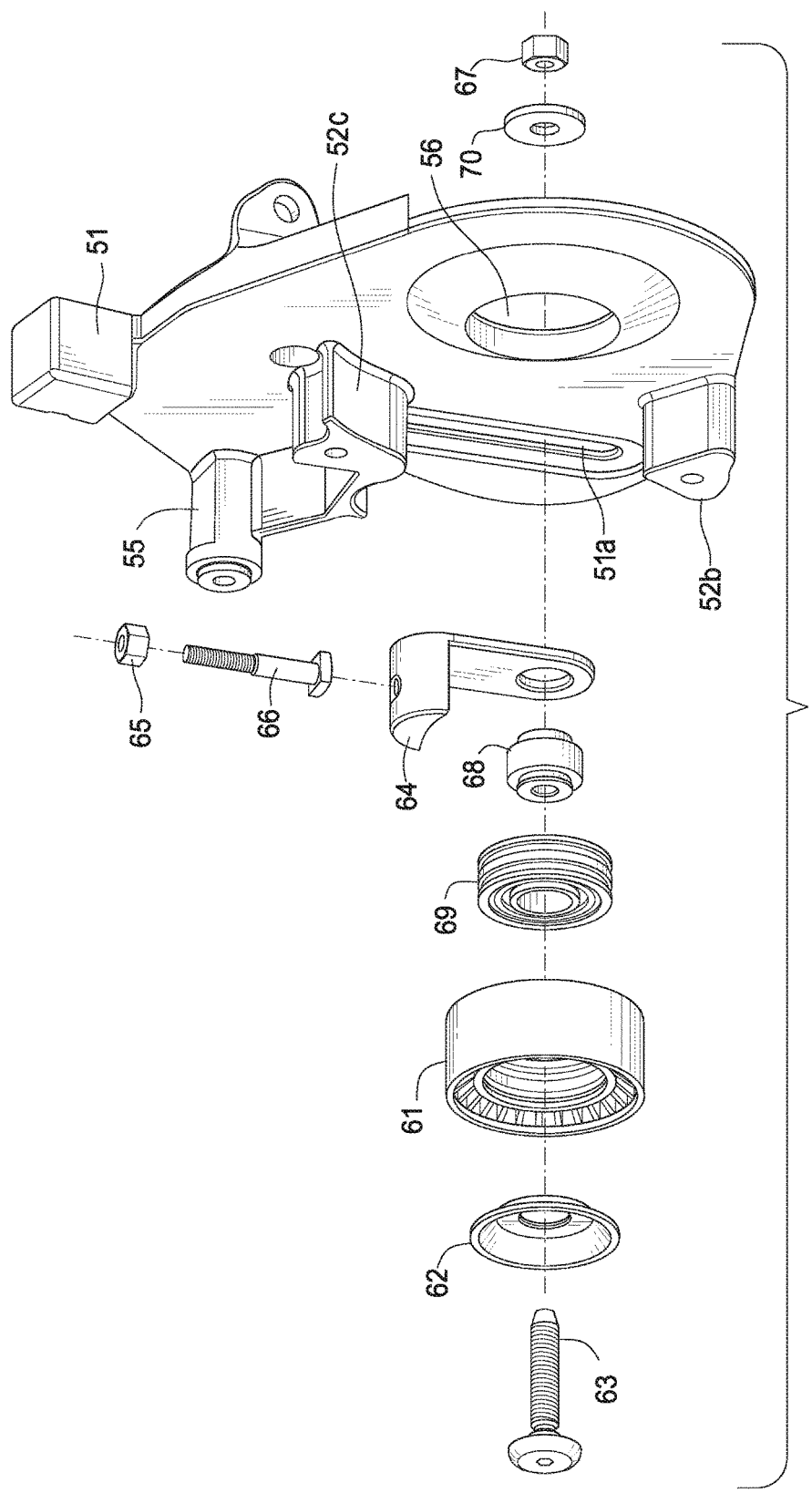
FIG. 11 is an exploded view of the bracket.

FIG. 11 is an exploded view of the bracket. Fastener 63 slides within slot 51a. Idler 23 is mounted to portion 55. Air conditioner compressor shaft 91 protrudes through hole 56.

Figure 12:
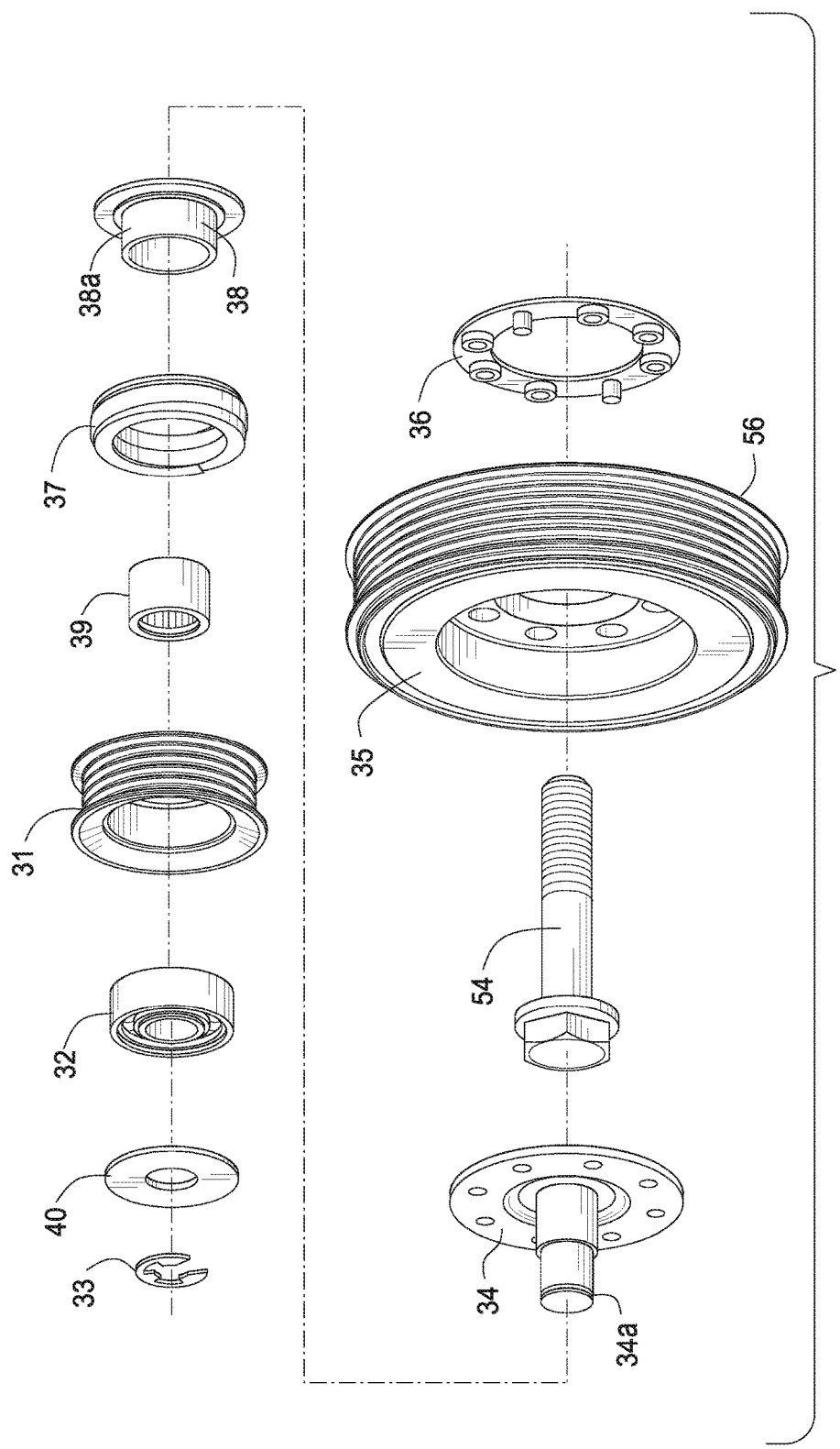
FIG. 12 is an exploded view of the crankshaft clutch.

FIG. 12 is an exploded view of the crankshaft clutch. Snap ring 33 engages slot 34a.

Figure 13:
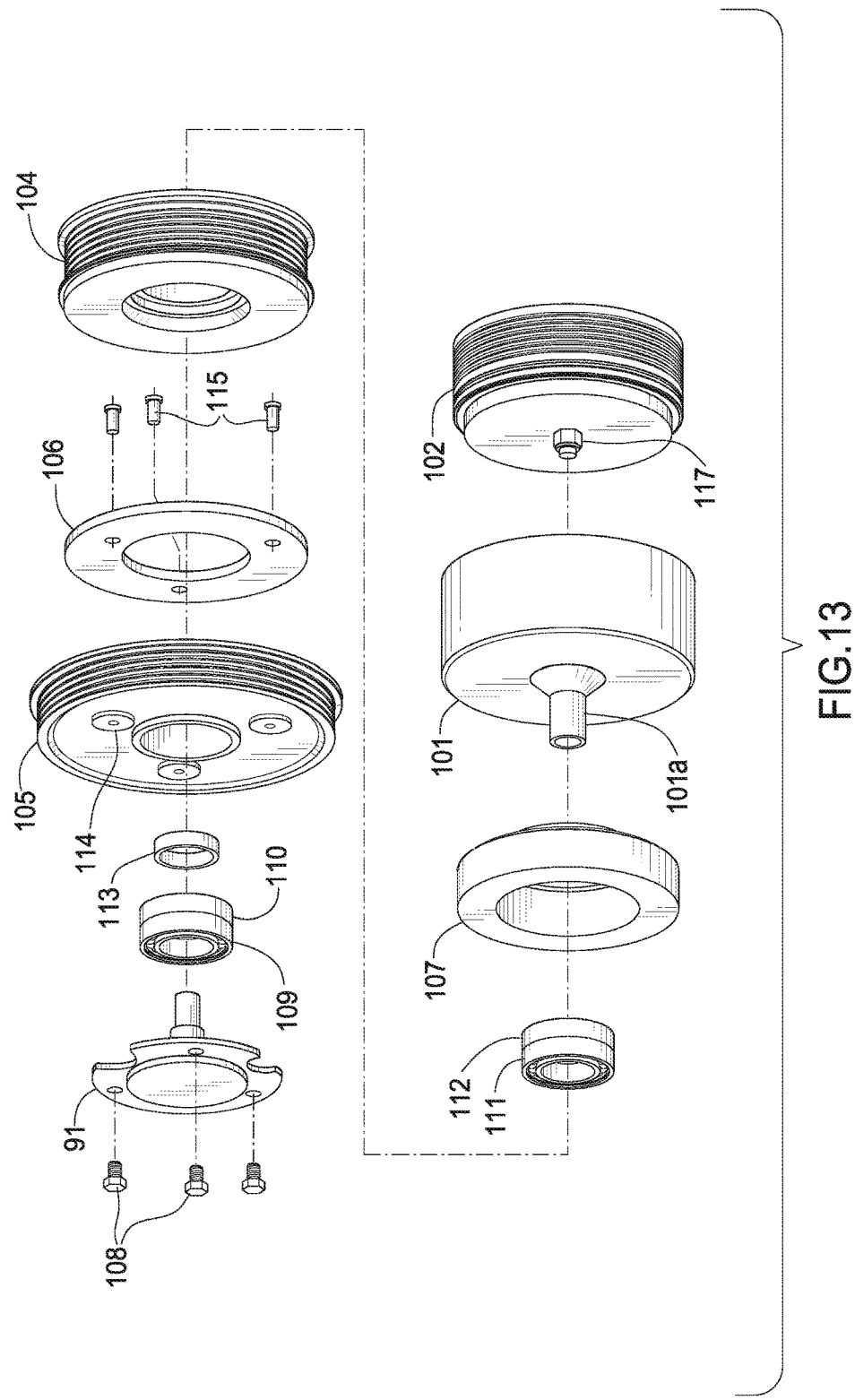
FIG. 13 is an exploded view of the AC clutch.

FIG. 13 is an exploded view of the clutch 107. Clutch plate 106 is mounted to pulley 105 with fasteners 114 and 115. Pulley 105 is mounted to shaft 91 with fasteners 108. Shaft 91 is press fit to portion 101a of 101.

Figure 14:
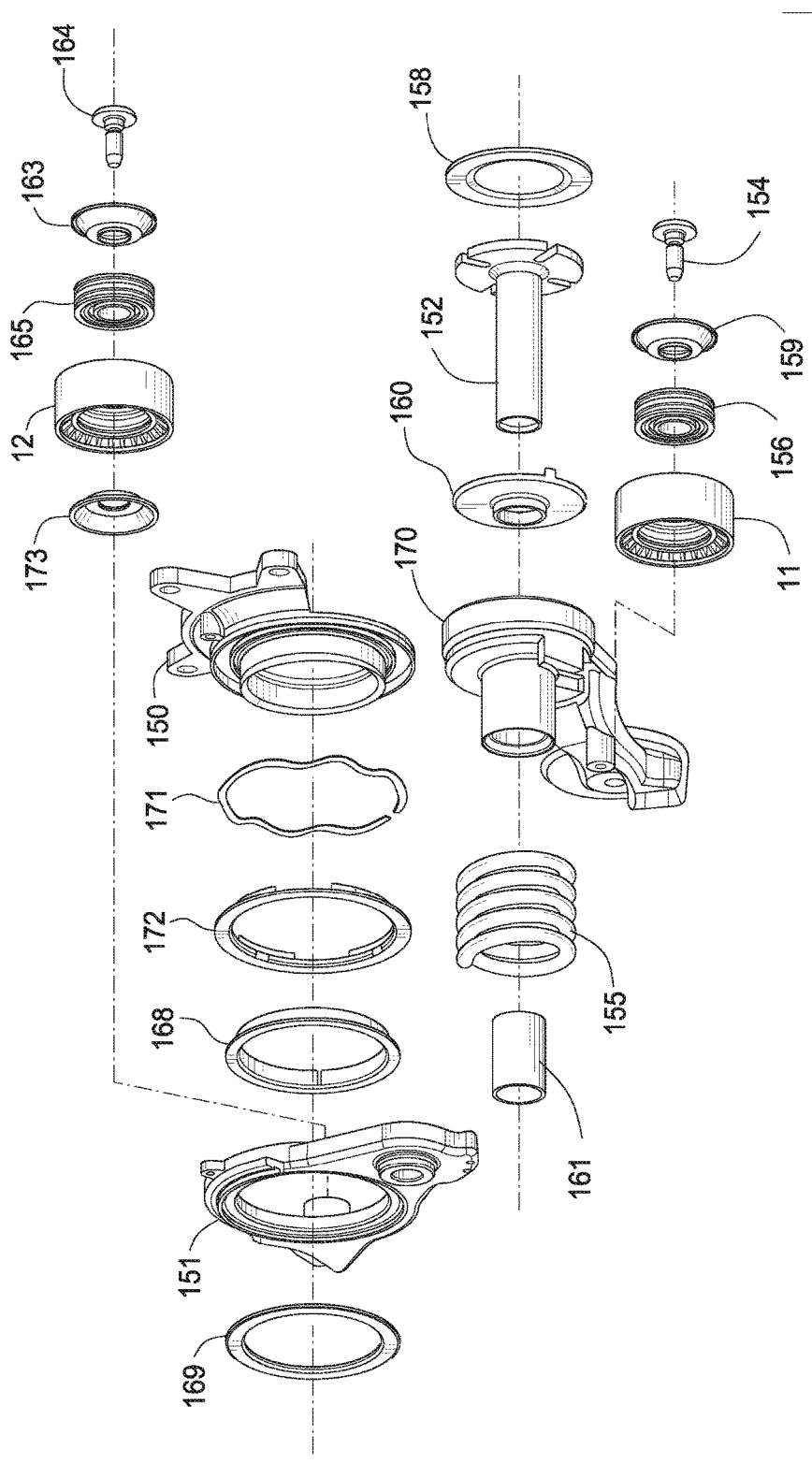
FIG. 14 is an exploded view of the tensioner.

FIG. 14 is an exploded view of the tensioner.

A starter generator system comprising an engine driving a first belt and drivably engaged with a second belt through a one-way clutch, a starter generator configured to be driven by the engine through the second belt or to drive the engine through the second belt and the first belt in series according to an engine condition, the starter generator drives an accessory when the engine is OFF, or when the engine is ON and operating in a predetermined engine RPM range, and the accessory engaged with the second belt through an accessory clutch, the accessory drivable by the engine through the first belt or drivable by the starter generator through the second belt according to an engine operating condition.

A starter generator system comprising an engine driving a first belt and drivably engaged with a second belt through a one-way clutch, a starter generator configured to be driven by the engine through the second belt or to drive the engine through the second belt and the first belt in series according to an engine condition, the starter generator drives an accessory when the engine is OFF, or the starter generator drives the accessory when the engine is ON and operating in a predetermined engine RPM range, and the accessory engaged with the second belt through an electromagnetic clutch, the accessory drivable by the engine through the first belt or drivable by the starter generator through the electromagnetic clutch according to an engine operating condition.

Although a form of the invention has been described herein, it will be obvious to those skilled in the art that variations may be made in the construction and relation of parts without departing from the spirit and scope of the inventions described herein.

We claim:

1. A starter generator system comprising:
    an engine driving a first belt and engaged with a second belt through a one-way clutch;
    a starter generator configured to be driven by the engine through the second belt or to drive the engine through the second belt according to an engine condition; and
    an accessory engaged with the second belt through an accessory clutch, the accessory drivable by the first belt or the second belt.

2. The starter generator system as in claim 1, wherein the engine drives the starter generator and the accessory through the second belt with the one-way clutch engaged.

3. The starter generator system as in claim 1, wherein the starter generator drives the engine through the first belt and the accessory and the accessory clutch is engaged.

4. The starter generator system as in claim 1, wherein the engine drives the starter generator through the first belt and the one-way clutch is over-running.

5. The starter generator system as in claim 1 further comprising a tensioner mounted to the starter generator, the tensioner disposed to rotate about the rotation axis of the starter generator.

6. The starter generator as in claim 1 further comprising an adjustable idler engaged with the first belt.

7. The starter generator system as in claim 1, wherein the accessory clutch comprises an electromagnetic clutch.

8. The starter generator system as in claim 5, wherein the tensioner comprises a first idler and a second idler.

9. The starter generator system as in claim 8, wherein the first idler is journalled to a swing arm.

10. The starter generator system as in claim 1, wherein the starter generator drives the accessory when the engine is OFF, or when the engine is ON and operating in a predetermined RPM range.

11. A starter generator system comprising:
    an engine driving a first belt and drivably engaged with a second belt through a one-way clutch;
    a starter generator configured to be driven by the engine through the second belt or to drive the engine through the second belt and the first belt in series according to an engine condition;
    the starter generator drives an accessory when the engine is OFF, or when the engine is ON and operating in a predetermined engine RPM range; and
    the accessory engaged with the second belt through an accessory clutch, the accessory drivable by the engine through the first belt or drivable by the starter generator through the second belt according to an engine operating condition.

12. The starter generator system as in claim 11, wherein the engine drives the starter generator and the accessory through the second belt when the one-way clutch is engaged.

13. The starter generator system as in claim 11, wherein the starter generator drives the engine through the first belt and the accessory and the accessory clutch is engaged.

14. The starter generator system as in claim 11, wherein the engine drives the starter generator through the first belt and the one-way clutch is over-running.

15. The starter generator system as in claim 11 further comprising a tensioner mounted to the starter generator, the tensioner disposed to rotate about the rotation axis of the starter generator.

16. The starter generator as in claim 11 further comprising an adjustable idler engaged with the first belt.

17. The starter generator as in claim 11, wherein the accessory clutch comprises an electromagnetic clutch.

18. The starter generator as in claim 15, wherein the tensioner comprises a first idler and a second idler.

19. The starter generator system as in claim 18, wherein the first idler is journalled to a swing arm.

20. A starter generator system comprising:
an engine driving a first belt and drivably engaged with a second belt through a one-way clutch;
a starter generator configured to be driven by the engine through the second belt or to drive the engine through the second belt and the first belt in series according to an engine condition;
the starter generator drives an accessory when the engine is OFF, or the starter generator drives the accessory when the engine is ON and operating in a predetermined engine RPM range; and
the accessory engaged with the second belt through an electromagnetic clutch, the accessory drivable by the engine through the first belt or drivable by the starter generator through the electromagnetic clutch according to an engine operating condition.

* * * * *

UNITED STATES PATENT AND TRADEMARK OFFICE
CERTIFICATE OF CORRECTION

PATENT NO. : 10,161,374 B2
APPLICATION NO. : 15/403660
DATED : December 25, 2018
INVENTOR(S) : Alexander Serkh, Keming Liu and Ilya Kleyman It is certified that error appears in the above-identified patent and that said Letters Patent is hereby corrected as shown below:

In the Drawings

Sheets 1-3, FIG. 1a, 1b and 1c, the reference numeral "171" should read --271--; "172" should read --272--.
Sheet 6, FIG. 4a, the reference numeral "30" should read --56--.
Sheet 7, FIG. 4b, the reference numeral "30" should read --56--; "104" should read --105--.
Sheet 14, FIG. 11, the reference numeral "55" should read --255--; "56" should read --256--.

In the Specification

Column 2, Lines 56 and 57, "171 and 172" should read --271 and 272"--; Lines 60-61, "first clutch pulley 104" should read --second clutch pulley 105--; Line 65, "second clutch pulley 105" should read --first clutch pulley 104--.
Column 3, Line 14, "retreating" should read --retracting"--; Line 30, "171 and 172" should read --271 and 272--; Line 47, "busing" should read --bushing--.
Column 4, Line 45, "38" should read --39--; Line 50, "108" should read --118--.
Column 7, Line 17, "Clutch 120" should read --Clutch 106--; Line 41, "portion 55" should read --portion 255--; Line 42, "hole 56" should read --hole 256--.

Signed and Sealed this
Third Day of November, 2020

Andrei Iancu
*Director of the United States Patent and Trademark Office*